(12) United States Patent
Yamamoto

(10) Patent No.: US 12,512,660 B2
(45) Date of Patent: Dec. 30, 2025

(54) POWER SUPPLY SYSTEM

(71) Applicant: Daifuku Co., Ltd., Osaka (JP)

(72) Inventor: Masaaki Yamamoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 244 days.

(21) Appl. No.: 18/105,919

(22) Filed: Feb. 6, 2023

(65) Prior Publication Data

US 2023/0253778 A1 Aug. 10, 2023

(30) Foreign Application Priority Data

Feb. 7, 2022 (JP) ................................. 2022-017175

(51) Int. Cl.
| | |
|---|---|
| *H02H 3/16* | (2006.01) |
| *G01R 19/165* | (2006.01) |
| *G01R 31/40* | (2020.01) |
| *G01R 31/52* | (2020.01) |
| *H02H 1/00* | (2006.01) |

(52) U.S. Cl.
CPC ......... *H02H 3/16* (2013.01); *G01R 19/16576* (2013.01); *G01R 31/40* (2013.01); *G01R 31/52* (2020.01); *H02H 1/0007* (2013.01)

(58) Field of Classification Search
CPC .......... H02H 3/16; H02H 1/0007; H02H 5/04; H02H 5/10; H02H 3/08; G01R 19/16576; G01R 31/40; G01R 31/52; G01R 31/54; G01R 31/58; G01R 31/083; B60L 3/0069; B60L 2250/16; B60M 5/00; B60M 5/02; B60M 7/00; B60M 7/003; B60M 2200/00

See application file for complete search history.

(56) References Cited

U.S. PATENT DOCUMENTS

| | | | | |
|---|---|---|---|---|
| 5,801,914 A | * | 9/1998 | Thrash | H05B 3/56 361/104 |
| 6,335,853 B1 | * | 1/2002 | Kitagawa | B60L 3/04 361/103 |
| 6,864,598 B2 | * | 3/2005 | Nogaret | B60L 9/22 307/10.1 |
| 7,783,924 B2 | * | 8/2010 | Zaman | G06F 1/30 713/340 |

(Continued)

FOREIGN PATENT DOCUMENTS

JP 2006337156 A 12/2006

*Primary Examiner* — Thienvu V Tran
*Assistant Examiner* — Muaamar Qahtan Al-Taweel
(74) *Attorney, Agent, or Firm* — The Webb Law Firm

(57) ABSTRACT

A thermosensitive wire includes a pair of conductive wires each covered with an insulator that softens at a preset temperature, and the pair of conductive wires are configured to come into contact with each other to be short-circuited in response to the insulator softening. A power supply system includes: a second power source configured to supply power to the pair of conductive wires; a short circuit detector configured to detect that the pair of conductive wires are short-circuited; a disconnection detector configured to detect that the pair of conductive wires are disconnected; and a controller configured to perform, for power supply to a power supply wire, abnormality control that differs between in the case where the short circuit detector detects that the pair of conductive wires are short-circuited and in the case where the disconnection detector detects that the pair of conductive wires are disconnected.

8 Claims, 6 Drawing Sheets

(56) References Cited

U.S. PATENT DOCUMENTS

| | | | |
|---|---|---|---|
| 9,849,787 B2* | 12/2017 | Cypers | B60L 3/04 |
| 10,830,648 B2* | 11/2020 | Nose | G01R 31/58 |
| 11,994,564 B2* | 5/2024 | Valmonte | G05B 9/03 |
| 12,111,367 B2* | 10/2024 | Takeda | G05B 19/042 |
| 2017/0104437 A1* | 4/2017 | Suzuki | H02P 29/0241 |
| 2022/0032778 A1* | 2/2022 | Kanesaki | B60L 3/12 |

* cited by examiner

POWER SUPPLY SYSTEM

CROSS-REFERENCE TO RELATED APPLICATION

This application claims priority to Japanese Patent Application No. 2022-017175 filed Feb. 7, 2022, the disclosure of which is hereby incorporated by reference in its entirety.

BACKGROUND OF THE INVENTION

1. Field of the Invention

The present invention relates to a power supply system that includes a power supply wire located along the route of a mobile object to supply power to the mobile object and a thermosensitive wire located along the power supply wire.

2. Description of the Related Art

Japanese Unexamined Patent Application Publication No. 2006-337156 discloses a power supply system that includes a power supply wire located along the route of a mobile object to supply power to the mobile object and a thermosensitive wire located along the power supply wire (hereafter, the reference signs in brackets in the Description of the Related Art are those in the document referenced). A thermosensitive wire (20) is formed by twisting a pair of conductors (20a, 20b) each of which is covered with a coating material that softens at a predetermined temperature or higher. In the case where the temperature of the power supply wire (3) rises due to, for example, overcurrent, the coating material softens and the pair of conductors (20a, 20b) are short-circuited. A temperature detection circuit (1) detects the occurrence of such a short circuit. A power supply device (4) stops power supply to the power supply wire (3), based on the detection result of the temperature detection circuit (1). The temperature detection circuit (1) is also configured to detect an open fault due to, for example, a disconnection of the thermosensitive wire (20). The occurrence of an open fault in the thermosensitive wire (20) makes it impossible to monitor the temperature of the power supply wire (3). As a result of the open fault being detected, however, the continuation of the situation in which the temperature cannot be monitored is prevented.

This power supply system includes a relay in series with the thermosensitive wire (20). When the thermosensitive wire (20) is energized, current flows through the coil (41) of the relay, and the contacts (42a, 42b) of the relay are closed. When the thermosensitive wire (20) is disconnected or short-circuited, current sufficient to excite the coil (41) of the relay does not flow, and the contacts (42a, 42b) of the relay are open. The contacts (42a, 42b) of the relay are respectively connected to a green LED for notifying that the temperature detection circuit (1) using the thermosensitive wire (20) is operating in a normal condition and an emergency switch for cutting off the power supply to the power supply wire (3). When the contact (42b) connected to the emergency switch is open, the emergency switch is activated to cut off the power supply to the power supply wire (3). When the contact (42a) connected to the green LED is open, the green LED is turned off to notify that the operating state of the temperature detection circuit (1) is not a normal condition. Thus, in the power supply system, such fail-safe control is appropriately performed by detecting a short circuit or a disconnection of the thermosensitive wire (20).

SUMMARY OF THE INVENTION

In the foregoing power supply system, a short circuit and a disconnection of the thermosensitive wire are detected as abnormalities in the thermosensitive wire without being distinguished from each other. If an abnormality is detected and the power supply to the power supply wire is cut off, the operation of the facility using the mobile object stops. For example, in the case where the thermosensitive wire is short-circuited, there is a possibility of a temperature rise of the power supply wire due to a short circuit or overcurrent caused by overload of the power supply device, and some kind of abnormality is likely to have occurred in the power supply facility. It is therefore preferable to cut off the power supply immediately upon detecting a short circuit. On the other hand, a disconnection (open fault) in the thermosensitive wire is not limited to be caused by a break in the thermosensitive wire, but may be caused, for example, by coming off of a connector for connecting the thermosensitive wire and the temperature detection circuit. In such a case, as a result of an operator checking and refitting the connector, the condition in which the temperature of the power supply wire can be monitored can be restored quickly. Thus, in the case where a disconnection is detected, the power supply to the power supply wire need not necessarily be cut off immediately.

It is therefore desirable to develop a technology capable of, in a power supply system that includes a power supply wire for supplying power to a mobile object and a thermosensitive wire located along the power supply wire, detecting a short circuit and a disconnection of the thermosensitive wire located along the power supply wire distinguishably from each other and performing fail-safe control according to the detection result.

In view of the above, a power supply system includes: a power supply wire located along a route of a mobile object and configured to supply power to the mobile object; a first power source configured to supply power to the power supply wire; a thermosensitive wire located along the power supply wire and including a pair of conductive wires each covered with an insulator that softens at a preset temperature, the pair of conductive wires being configured to come into contact with each other to be short-circuited in response to the insulator softening; a second power source configured to supply power to the pair of conductive wires; a short circuit detector configured to detect that the pair of conductive wires are short-circuited; a disconnection detector configured to detect that the pair of conductive wires are disconnected; and a controller configured to perform, for power supply to the power supply wire, abnormality control that differs between in the case where the short circuit detector detects that the pair of conductive wires are short-circuited and in the case where the disconnection detector detects that the pair of conductive wires are disconnected.

With this structure, a short circuit of the pair of conductive wires caused by abnormal heat generation of the power supply wire and a disconnection of the pair of conductive wires can be detected distinguishably from each other, and based on the detection result, abnormality control that differs depending on whether the abnormality is a short circuit or a disconnection can be performed. It is thus possible to detect a short circuit and a disconnection of the thermosensitive wire located along the power supply wire distinguishably from each other and perform fail-safe control according to the detection result.

Further features and advantages of the power supply system will become apparent from the following description of exemplary and non-limiting embodiments with reference to the drawings.

DESCRIPTION OF THE INVENTION

Figure 1:
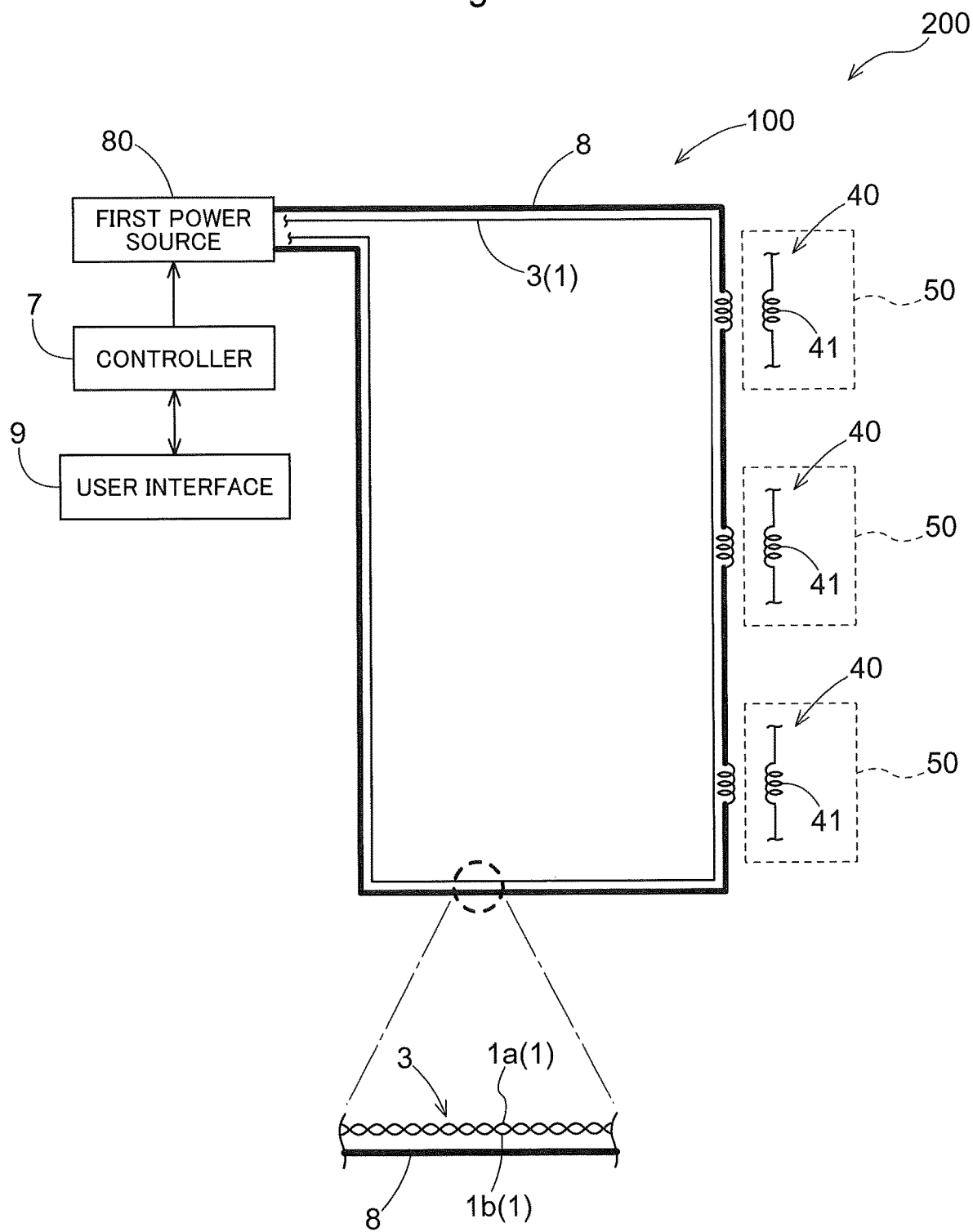
FIG. 1 is a diagram schematically illustrating the structure of an article transport facility including a power supply system.
Figure 2:
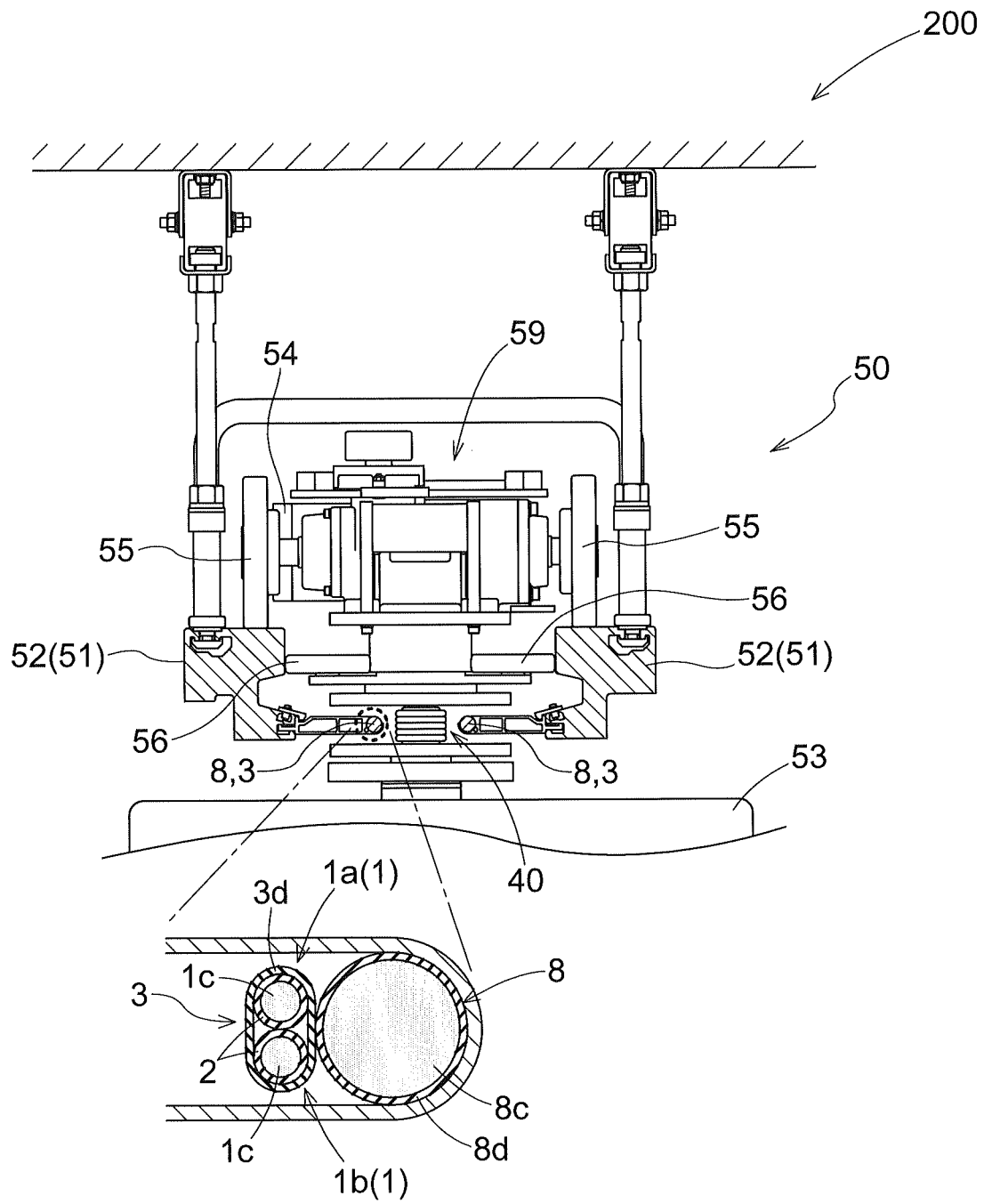
FIG. 2 is a front view of a mobile object.

Embodiments of a power supply system will be described below with reference to the drawings, using an example of supplying power to an article transport vehicle in an article transport facility. As illustrated in FIGS. 1 and 2, a mobile object 50 which is an article transport vehicle in an article transport facility 200 travels on travel rails 52 located along a route 51 which is a travel route. As illustrated in FIG. 1, a power supply system 100 includes: a power supply wire 8 located along the route 51 of the mobile object 50 to supply power to the mobile object 50; a first power source 80 that supplies power to the power supply wire 8; and a thermosensitive wire 3 located along the power supply wire 8.

As illustrated in FIG. 2, for example, the mobile object 50 includes: a travel section 59 that travels along the route 51 by being guided by the pair of travel rails 52 suspended from and supported by the ceiling; a transport vehicle body 53 located below the travel rails 52 and suspended from and supported by the travel section 59; and a power reception device 40 that receives drive power contactlessly from the power supply wire 8 located along the route 51. The transport vehicle body 53 includes an article support section (not illustrated) that is vertically movable in the transport vehicle body 53 and supports an article in a suspended state. Examples of the article to be transported by the mobile object 50 include front opening unified pods (FOUPs) for containing semiconductor substrates, and glass substrates as materials for displays.

As illustrated in FIG. 2, the travel section 59 includes a pair of travel wheels 55 that are rotationally driven by an electric drive motor 54. The travel wheels 55 roll along the traveling surfaces formed by the upper surfaces of the respective travel rails 52. The travel section 59 also includes a pair of guide wheels 56 that each freely rotate about an axis in the vertical direction (i.e. vertical axis), in a state of being in contact with the inner side surfaces of the pair of travel rails 52. The travel section 59 further includes the drive motor 54 for traveling, a drive circuit thereof, and the like, to cause the mobile object 50 to travel along the travel rails 52. The transport vehicle body 53 includes an actuator that vertically moves the article support section, an actuator that drives a holding section for holding the article, etc., and drive circuits thereof.

Power to the drive motor 54, the actuators, the drive circuits for driving them, etc. is supplied from the power supply wire 8 to the power reception device 40 contactlessly.

In this embodiment, the power supply wire 8 for supplying drive power to the mobile object 50 via the power reception device 40 is located along a horizontal plane with respect to the power reception device 40 and on both sides of a route width direction orthogonal to the route 51.

In this embodiment, the power reception device 40 supplies drive power to the mobile object 50 using wireless power supply technology called High Efficiency Inductive Power Distribution Technology (HID). Specifically, a high-frequency current is passed through the power supply wire 8 which is an induction line, to generate a magnetic field around the power supply wire 8. The power reception device 40 includes a pickup coil 41 and a magnetic core, and the pickup coil 41 is induced by electromagnetic induction from the magnetic field. The induced AC power is converted into DC power by a rectifier circuit such as a full-wave rectifier circuit and a power reception circuit including a smoothing capacitor and the like (not illustrated), and is supplied to the actuators and the drive circuits.

Although an article transport vehicle that is an overhead transport vehicle is used as an example of the mobile object 50 in this specification, the mobile object 50 may be an article transport vehicle that travels on the ground. The mobile object 50 may take any form as long as it operates by being supplied with power from the power supply wire 8 located along the route 51. The mobile object 50 is not limited to an article transport vehicle.

Figure 3:
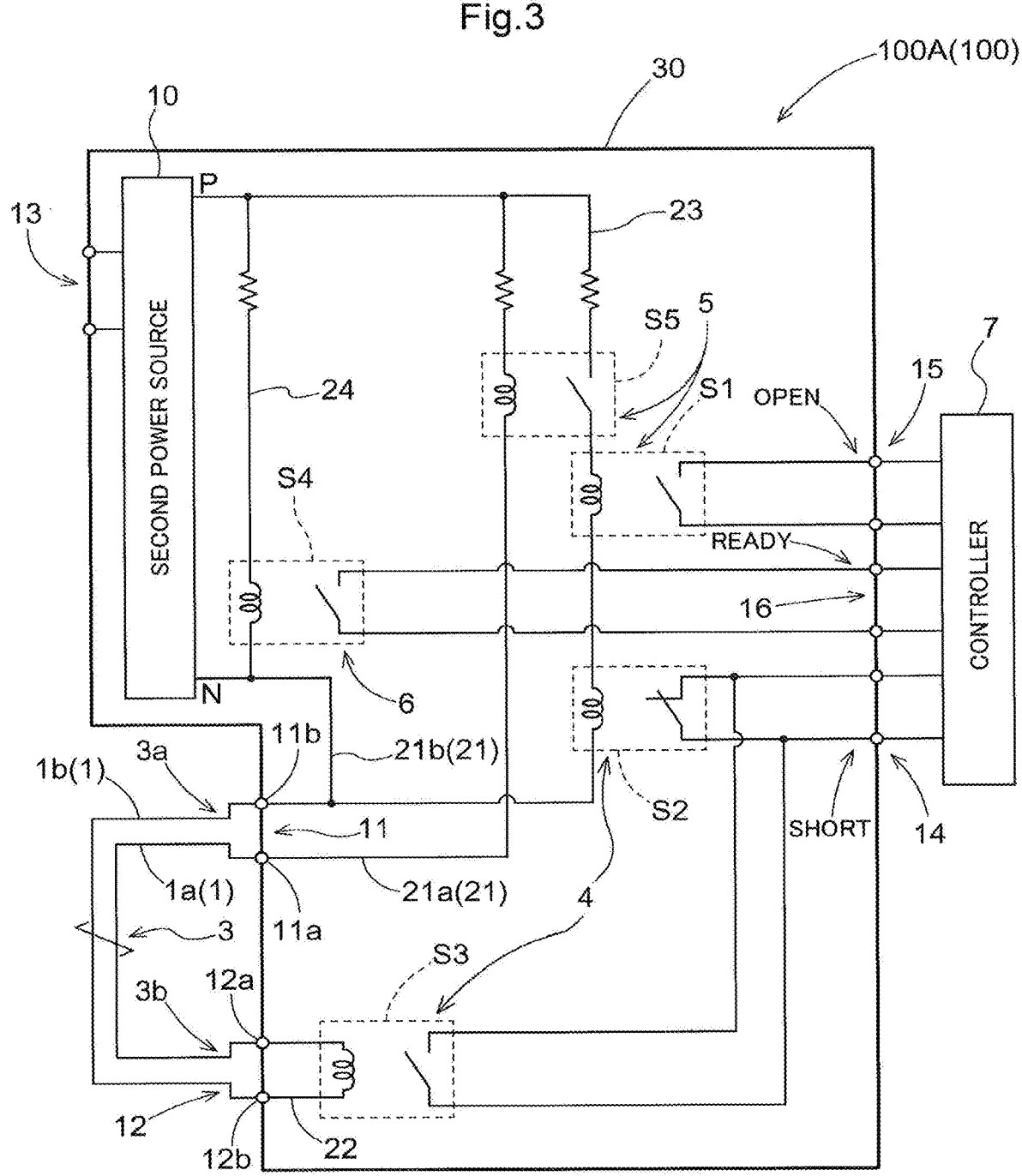
FIG. 3 is a schematic circuit block diagram illustrating a first example of the power supply system.
Figure 4:
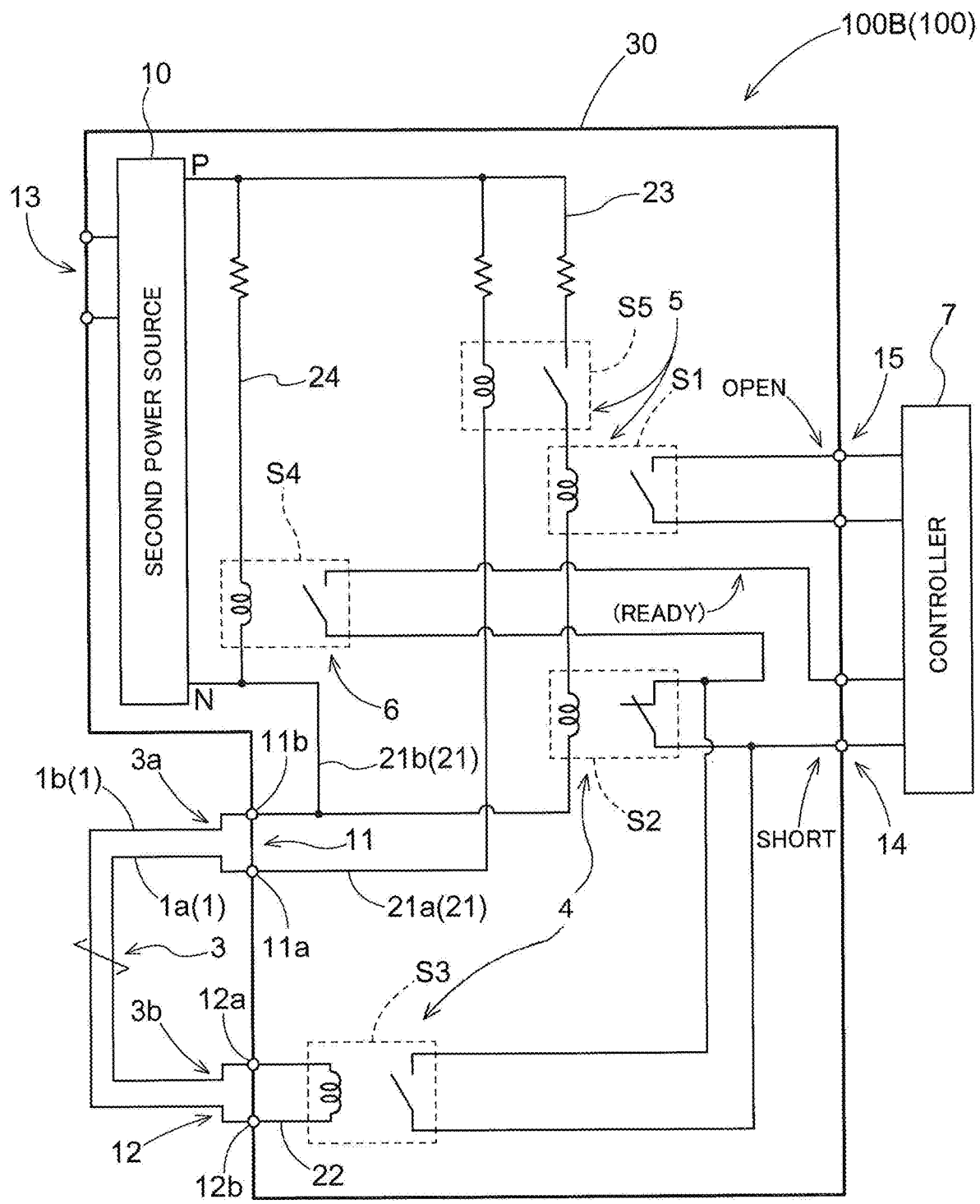
FIG. 4 is a schematic circuit block diagram illustrating a second example of the power supply system.
Figure 5:
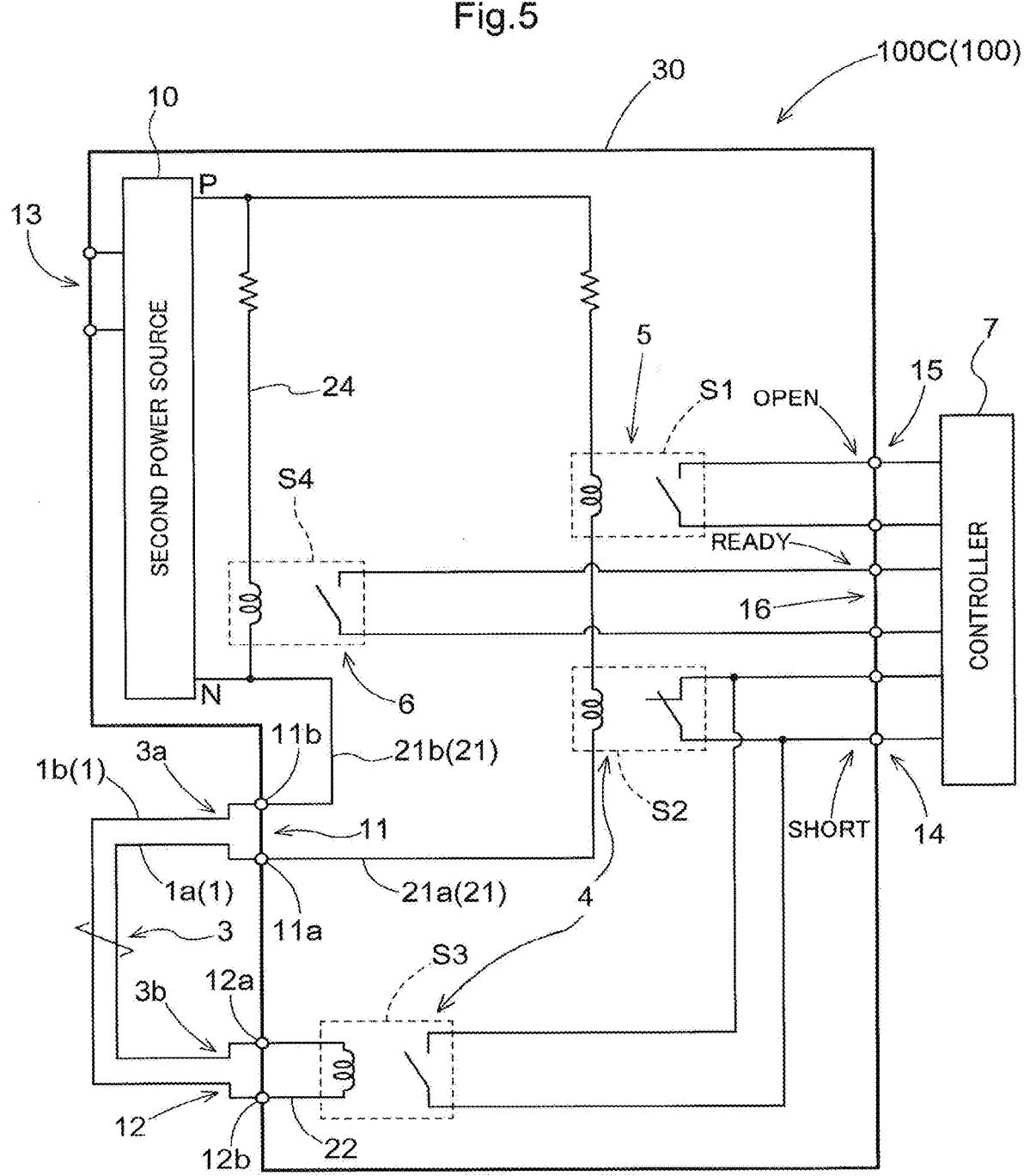
FIG. 5 is a schematic circuit block diagram illustrating a third example of the power supply system.

As illustrated in FIGS. 1 and 2, the thermosensitive wire 3 includes a pair of conductive wires 1 each covered with an insulator 2 that softens at a preset temperature. Each conductor wire 1 is a covered conductor wire obtained by covering a core wire 1c formed of a conductor with the insulator 2. The two conductive wires 1, i.e. the first conductive wire 1a and the second conductive wire 1b, are twisted to form a twisted pair, which is further covered with a coating material 3d to form the thermosensitive wire 3 including the pair of conductive wires 1. As illustrated in FIGS. 3 to 5, the power supply system 100 includes a second power source 10. One end (first end) of the first conductive wire 1a and one end (first end) of the second conductive wire 1b at one end (first end) of the thermosensitive wire 3 are connected to the positive terminal P and the negative terminal N of the second power source 10 respectively. The other end (second end) of the first conductive wire 1a and the other end (second end) of the second conductive wire 1b at the other end (second end) of the thermosensitive wire 3 are connected to each other.

For example, in the case where the scale of the article transport facility 200 is large, the scale of the power supply system 100 is large, and the power supply wire 8 is long. In such a case, the thermosensitive wire 3 located along the power supply wire 8 is long, too. Then, each of the first conductive wire 1a and the second conductive wire 1b may be not formed by a single conductive wire 1 but formed by a plurality of conductive wires 1 electrically connected by being coupled via a repeater (not illustrated). The repeater and each conductive wire 1 are connected, for example, via a connector (not illustrated). Even in the case where the first conductive wire 1a is formed by a plurality of conductive wires 1 in this way, the plurality of conductive wires 1 connected together is regarded as one first conductive wire 1a. Even in the case where the second conductive wire 1b is formed by a plurality of conductive wires 1 in this way, the plurality of conductive wires 1 connected together is regarded as one second conductive wire 1b.

The pair of conductive wires 1 as a twisted wire are configured so that, when the insulator 2 softens, the core wires 1c formed of conductors come into contact with each other to be short-circuited. Here, even when the insulator 2 softens, the core wires 1c are prevented from being exposed to the outside because the thermosensitive wire 3 including the pair of conductive wires 1 is covered with a coating material 3d. The power supply wire 8 also includes a power supply wire body 8c (core wire) formed of a conductor and a coating 8d formed of an insulator and covering the power supply wire body 8c. The thermo sensitive wire 3 is located along the power supply wire 8 in the vicinity of the power supply wire 8, preferably in close contact with the power supply wire 8. When the temperature of the power supply wire 8 rises, the insulator 2 softens and the core wires 1c come into contact with each other in an uninsulated state to be short-circuited, as mentioned above. The power supply system 100 includes a short circuit detector 4. By detecting the occurrence of such a short circuit in a state in which the second power source 10 is energizing the thermosensitive wire 3, it is possible to detect an abnormality (temperature rise) of the power supply wire 8.

The power supply system 100 also includes a disconnection detector 5. By detecting that no current is flowing through the thermosensitive wire 3 in a state in which the second power source 10 is energizing the thermosensitive wire 3, it is possible to detect that the thermosensitive wire 3 is in an open state, i.e. a disconnection occurs in the thermosensitive wire 3. Herein, the term "disconnection" encompasses that the core wire 1c of either the first conductive wire 1a or the second conductive wire 1b is broken (including not only the case where the core wire 1c is completely broken but also the state in which the core wire 1c is about to break and the impedance is very high), that the connection between the first conductive wire 1a and the second conductive wire 1b is severed, that the electrical connection in the connector (a first terminal pair 11 and a second terminal pair 12 described later with reference to FIGS. 3 to 5) connecting the thermosensitive wire 3 and the second power source 10 is interrupted, that the electrical connection in the connector connecting the conductive wires 1 to extend the first conductive wire 1a and the second conductive wire 1b is interrupted, etc.

In this embodiment, the second power source 10, the short circuit detector 4, and the disconnection detector 5 are mounted on a thermosensitive control board 30. In this embodiment, a power source abnormality detector 6 that detects that the voltage of the second power source 10 is less than or equal to a preset criterion voltage is also provided on the thermosensitive control board 30. With the provision of the power source abnormality detector 6, the power supply system 100 can detect the state in which the thermosensitive wire 3 cannot be appropriately energized despite there being no short circuit or disconnection in the thermosensitive wire 3. The power supply system 100 may include only the short circuit detector 4 and the disconnection detector 5 without including the power source abnormality detector 6.

The power supply system 100 includes a controller 7. The controller 7 performs abnormality control for the power supply to the power supply wire 8, based on the detection results of the short circuit detector 4, the disconnection detector 5, and the power source abnormality detector 6. In this embodiment, the power supply system 100 also includes a user interface 9 that receives input of information from an operator (user) and outputs information to the operator. As the abnormality control, the controller 7 notifies the operator of information based on the detection result of the short circuit detector 4, the disconnection detector 5, or the power source abnormality detector 6 that has triggered the abnormality control. The power supply system 100 may not include the user interface 9.

The power supply system 100 according to this embodiment performs different abnormality control at least based on the detection results of the short circuit detector 4 and the disconnection detector 5. In detail, the controller 7 performs, for the power supply to the power supply wire 8, abnormality control that differs between in the case where the short circuit detector 4 detects that the pair of conductive wires 1 are short-circuited and in the case where the disconnection detector 5 detects that the pair of conductive wires 1 are disconnected.

For example, in the case where a short circuit and a disconnection of the thermosensitive wire 3 are detected as abnormalities in the thermosensitive wire 3 without being distinguished from each other, the power supply to the power supply wire 8 is cut off when an abnormality in the thermosensitive wire 3 is detected. In the case where the thermosensitive wire 3 is short-circuited, there is a possibility of, for example, a temperature rise of the power supply wire 8 due to a short circuit in the power supply circuit system including the power supply wire 8 or overcurrent caused by overload of the first power source 80. It is therefore preferable to cut off the power supply to the power supply wire 8 immediately. On the other hand, a disconnection (open fault) in the thermosensitive wire 3 is not limited to be caused by a break in the conductive wires 1, and may be caused by a connection failure in the connector connecting the thermosensitive control board 30 and the conductive wires 1 or a connection failure in the connector connecting the conductive wires 1. In such a case, as a result of the operator (user) checking and refitting the connector, for example, the connection failure can be resolved to quickly restore the condition in which the temperature of the power supply wire 8 can be monitored. Thus, in the case where a disconnection is detected, the power supply to the power supply wire 8 need not necessarily be cut off immediately. The power supply system 100 according to this embodiment can perform abnormality control that differs between in the case where a short circuit is detected and in the case where a disconnection is detected. Hence, it is possible to prevent the operation of the facility using the mobile object 50 from being stopped by uniformly cutting off the power supply to the power supply wire 8 in the case where an abnormality in the thermosensitive wire 3 is detected.

For example, the controller 7 performs abnormality control that differs between in the case where the short circuit detector 4 detects that the pair of conductive wires 1 are short-circuited and in the case where the disconnection detector 5 detects that the pair of conductive wires 1 are disconnected, as follows: In the case where the short circuit detector 4 detects that the pair of conductive wires 1 are short-circuited, as the abnormality control (short circuit abnormality control), the controller 7 immediately stops the power supply to the power supply wire 8 from the first power source 80, outputs power supply abnormality information indicating the abnormality of the power supply wire 8 by the user interface 9, and suspends the power supply to the power supply wire 8 until the user interface 9 receives input indicating verification that the power supply wire 8 is a normal condition. In the case where the disconnection detector 5 detects that the pair of conductive wires 1 are disconnected, as the abnormality control (disconnection abnormality control), the controller 7 continues the power supply to the power supply wire 8 from the first power source 80, and outputs check request information requesting to check the state of the thermosensitive wire 3 by the user interface 9.

To continue the power supply to the power supply wire 8 from the first power source 80 includes to temporarily stop the power supply to the power supply wire 8 from the first power source 80 and thereafter resume the power supply to the power supply wire 8 from the first power source 80 upon the user interface 9 receiving input indicating permission to continue the power supply to the power supply wire 8. Alternatively, to continue the power supply to the power supply wire 8 from the first power source 80 may be limited to continue the power supply to the power supply wire 8 from the first power source 80 without temporarily stopping it.

In the case where the power supply system 100 does not include the user interface 9, for example, the controller 7 may, as the abnormality control (short circuit abnormality control), immediately stop the power supply to the power supply wire 8 from the first power source 80, and, as the abnormality control (disconnection abnormality control), continue the power supply to the power supply wire 8 from the first power source 80. In this case, the mobile object 50 is stopped as a result of the power supply to the power supply wire 8 from the first power source 80 being stopped, and the operator responsively checks the status of the power supply wire 8. If the power supply wire 8 is the normal condition, the power supply to the power supply wire 8 can be resumed by, for example, manual operation by the operator. In many cases, the operating states of the article transport facility 200 and the power supply system 100 are recorded, and the records are regularly checked by the operator. In such cases, the operator can find out that a disconnection is detected based on the records, and check the thermosensitive wire 3.

In the case where the power supply system 100 includes the power source abnormality detector 6, it is preferable that the controller 7 further performs abnormality control (power source abnormality control) different from the foregoing short circuit abnormality control and disconnection abnormality control. In detail, it is preferable that, in the case where the power source abnormality detector 6 detects that the voltage of the second power source 10 is less than or equal to the criterion voltage, the controller 7 performs, for the power supply to the power supply wire 8, different abnormality control from in the case where the short circuit detector 4 detects that the pair of conductive wires 1 are short-circuited and in the case where the disconnection detector 5 detects that the pair of conductive wires 1 are disconnected.

For example, in the case where the power source abnormality detector 6 detects that the voltage of the second power source 10 is less than or equal to the criterion voltage, the controller 7 immediately stops the power supply to the power supply wire 8 from the first power source 80, outputs second power source abnormality information indicating the abnormality of the second power source 10 by the user interface 9, and suspends the power supply to the power supply wire 8 until the user interface 9 receives input indicating verification that the second power source 10 is the normal condition.

In the case where the power supply system 100 does not include the user interface 9, for example, the controller 7 may immediately stop the power supply to the power supply wire 8 from the first power source 80 as the abnormality control (power source abnormality control), as in the short circuit abnormality control. That is, the controller 7 may perform, as the power source abnormality control, the same abnormality control as the short circuit abnormality control, instead of the abnormality control different from the short circuit abnormality control and the disconnection abnormality control. In such a case, too, the mobile object 50 is stopped as a result of the power supply to the power supply wire 8 from the first power source 80 being stopped, and the operator responsively checks the status of the power supply wire 8 and the second power source 10. If the power supply wire 8 and the second power source 10 are the normal condition, the power supply to the power supply wire 8 can be resumed by, for example, manual operation by the operator. In this case, since there is no need to distinguish between a short circuit and a power source abnormality, the power source abnormality detector 6 and the short circuit detector 4 may be implemented not as separate detectors but as a common detector (see, for example, FIG. 4).

Specific circuit structures will be described below as examples. FIG. 3 is a circuit block diagram illustrating a first example (first power supply system 100A) of the power supply system 100. As illustrated in FIG. 3, the first power supply system 100A includes: a first element S1 included in the disconnection detector 5 and serving as the core of the disconnection detector 5; a second element S2 and a third element S3 included in the short circuit detector 4 and serving as the core of the short circuit detector 4; a fourth element S4 included in the power source abnormality detector 6 and serving as the core of the power source abnormality detector 6; and a fifth element S5 indirectly included in the disconnection detector 5 and assisting the disconnection detector 5. In this embodiment, the first element S1, the second element S2, the third element S3, the fourth element S4, and the fifth element S5 are each a mechanical relay including a coil and contacts. Alternatively, each of these elements may be a solid state relay (SSR), a selector, a switch, or the like. The use of the mechanical relay as in this embodiment makes it unnecessary to provide a power source other than the second power source 10 for energizing the thermosensitive wire 3, and thus can suppress an increase in circuit size.

As illustrated in FIG. 3, the first element S1, the second element S2, the third element S3, the fourth element S4, and the fifth element S5 are mounted on the thermosensitive control board 30. A circuit constituting the second power source 10, such as a DC-DC converter, is also mounted on the thermosensitive control board 30. Further, a first terminal pair 11, a second terminal pair 12, a third terminal pair 13, a fourth terminal pair 14, a fifth terminal pair 15, and a sixth terminal pair 16 are provided on the thermosensitive control board 30. In addition, a pair of first connection lines 21 (positive-side first connection line 21a, negative-side first connection line 21b), one second connection line 22, one branch wire 23, and one power source monitoring line 24 are formed on the thermosensitive control board 30.

The first terminal pair 11 and the second terminal pair 12 are terminal pairs to which the pair of conductive wires 1 constituting the thermosensitive wire 3 are connected. The terminals of the first terminal pair 11 are connected to the respective pair of conductive wires 1, and connected to the respective pair of first connection lines 21. The terminals of the second terminal pair 12 are connected to each other by the second connection line 22 on the thermosensitive control board 30. Specifically, the positive-side first connection line 21a of the pair of first connection lines 21 is connected between the positive terminal P of the second power source 10 and the positive-side first terminal 11a of the first terminal pair 11, and the negative-side first connection line 21*b* of the pair of first connection lines 21 is connected between the negative terminal N of the second power source 10 and the negative-side first terminal 11*b* of the first terminal pair 11. The first conductive wire 1*a* of the thermosensitive wire 3 is connected between the positive-side first terminal 11*a* of the first terminal pair 11 and the positive-side second terminal 12*a* of the second terminal pair 12, and the second conductive wire 1*b* of the thermosensitive wire 3 is connected between the negative-side first terminal 11*b* of the first terminal pair 11 and the negative-side second terminal 12*b* of the second terminal pair 12.

That is, the power supply system 100 includes: the first terminal pair 11 to which the respective one ends (first ends) of the pair of conductive wires 1 are connected at a thermosensitive wire first end 3*a* which is one end of the thermosensitive wire 3; the second terminal pair 12 to which the respective other ends (second ends) of the pair of conductive wires 1 are connected at a thermosensitive wire second end 3*b* which is the other end of the thermosensitive wire 3; the pair of first connection lines 21 connecting the first terminal pair 11 and the second power source 10; and the second connection line 22 connecting the terminals of the second terminal pair 12. The thermosensitive wire 3 and the second power source 10 are connected in the order of the positive terminal P of the second power source 10, the positive-side first connection line 21*a*, the positive-side first terminal 11*a*, the first conductive wire 1*a*, the positive-side second terminal 12*a*, the second connection line 22, the negative-side second terminal 12*b*, the second conductive wire 1*b*, the negative-side first terminal 11*b*, the negative-side first connection line 21*b*, and the negative terminal N, thus forming a closed circuit.

The third terminal pair 13 is a terminal pair that supplies power to the second power source 10. For example, the second power source 10 is supplied with power from an AC-DC converter (not illustrated) that generates DC power from a commercial power source of 100 [V] to 200 [V], via the third terminal pair 13. The second power source 10 steps down the voltage (for example, 24 [V] to 48 [V]) supplied from the AC-DC converter to, for example, 12 [V] to 15 [V] and supplies it to the thermosensitive wire 3. The third terminal pair 13 is a terminal pair connecting the AC-DC converter and the second power source 10.

The fourth terminal pair 14 is a terminal pair that outputs a short circuit signal (SHORT) to the controller 7. The controller 7 includes a processor such as a microcomputer as its core. One terminal of the fourth terminal pair 14 is connected to at least one port (input port) of the microcomputer. The other terminal of the fourth terminal pair 14 is connected to a positive voltage (for example, 5 [V] or 3.3 [V]) line in the controller 7 or another port (output port) of the microcomputer that outputs the positive voltage. When the fourth terminal pair 14 is conducting, the positive voltage in the controller 7 is input to the foregoing input port, and the microcomputer determines that the short circuit signal is in the ON state and determines that the thermosensitive wire 3 is the normal condition in terms of short-circuiting. That is, when the fourth terminal pair 14 is conducting, the short circuit signal is in the ON state, indicating that the thermosensitive wire 3 is the normal condition. When the fourth terminal pair 14 is not conducting, the short circuit signal is in the OFF state, indicating that the thermosensitive wire 3 is an abnormal condition (i.e. the pair of conductive wires 1 are short-circuited).

Herein, the expression "when the terminal pair is conducting" means that the two terminals constituting the terminal pair are electrically connected and are in conduction with each other. The expression "when the terminal pair is not conducting" means that the two terminals constituting the terminal pair are not electrically connected and are not in conduction with each other. The same applies to the expressions "when the terminal pair is conducting" and "when the terminal pair is not conducting" used with regard to the second terminal pair 12, the fifth terminal pair 15, the sixth terminal pair 16, etc. The method of generating each of a disconnection signal and a power source abnormality signal in cooperation with the controller 7 is the same as that for the short circuit signal, and accordingly its detailed description is omitted.

The fifth terminal pair 15 is a terminal pair that outputs the disconnection signal (OPEN) to the controller 7. When the fifth terminal pair 15 is conducting, the disconnection signal is in the ON state, indicating that the thermosensitive wire 3 is the normal condition. When the fifth terminal pair 15 is not conducting, the disconnection signal is in the OFF state, indicating that the thermosensitive wire 3 is the abnormal condition (i.e. at least one of the pair of conductive wires 1 is disconnected).

The sixth terminal pair 16 is a terminal pair that outputs the power source abnormality signal (READY) to the controller 7. When the sixth terminal pair 16 is conducting, the power source abnormality signal is in the ON state, indicating that the second power source 10 is in a state (READY state) of being capable of supplying power to the thermosensitive wire 3 and is operating normally. When the sixth terminal pair 16 is not conducting, the power source abnormality signal is in the OFF state, indicating that the second power source 10 is the abnormal condition and power cannot be sufficiently supplied to the thermosensitive wire 3.

The first element S1 as the core of the disconnection detector 5 monitors the current flowing through the pair of first connection lines 21. In the first power supply system 100A, the first element S1 is connected to the branch wire 23 that is connected in parallel with the pair of first connection lines 21. The first element S1 in this embodiment, which is a mechanical relay, is connected to the branch wire 23 in a form in which its coil is connected in series with the branch wire 23. The contacts of the first element S1 are connected in series between the terminals of the fifth terminal pair 15. When the contacts of the first element S1 are closed, the disconnection signal is in the ON state. When the contacts of the first element S1 are open, the disconnection signal is in the OFF state. In this embodiment, the first element S1 is a mechanical relay having Form A contacts (make contacts). The first element S1 is an element whose contacts are closed in the case where current flows through the pair of first connection lines 21 (branch wire 23) and current sufficient to close the contacts flows through the coil and are open in the case where a disconnection or the like occurs in the thermosensitive wire 3 and current sufficient to close the contacts does not flow through the pair of first connection lines 21 (branch wire 23).

In the following description, the simple expression "in the case where current flows through the coil" means "in the case where current sufficient to close the contacts flows through the coil" when describing the conditions of opening/closing the contacts, unless otherwise stated. Likewise, the simple expression "in the case where current does not flow through the coil" means "in the case where current sufficient to close the contacts does not flow through the coil" when describing the conditions of opening/closing the contacts, unless otherwise stated.

In the case where at least one of the pair of conductive wires 1 constituting the thermosensitive wire 3 is disconnected, current does not flow through the first connection lines 21 forming the closed circuit between the second power source 10 and the thermosensitive wire 3, but there is a possibility that current keeps flowing through the branch wire 23 connected in parallel with the first connection lines 21 on the thermosensitive control board 30. The fifth element S5 is provided to cut off the current flowing through the branch wire 23 in the case where the thermosensitive wire 3 is disconnected and current stops flowing through the first connection lines 21. In this embodiment, the fifth element S5 which is a mechanical relay having Form A contacts (make contacts) has a coil connected in series with the first connection line 21 (positive-side first connection line 21a in this example) and contacts connected in series with the branch wire 23. The contacts of the fifth element S5 are closed in the case where current flows through the pair of first connection lines 21. Accordingly, when the thermosensitive wire 3 is not disconnected, current flows through the branch wire 23 connected in parallel with the first connection lines 21. The contacts of the fifth element S5 are open when current does not flow through the pair of first connection lines 21. Accordingly, when the thermosensitive wire 3 is disconnected, the branch wire 23 is disconnected and current stops flowing. That is, the current flowing through the branch wire 23 is cut off by the fifth element S5. As a result of current stopping flowing through the branch wire 23, the contacts of the first element S1 are open. Thus, the fifth element S5 is an element that assists the disconnection detector 5, and may be regarded as being included in the disconnection detector 5.

The second element S2 as the core of the short circuit detector 4 is an element that monitors the current flowing through the pair of first connection lines 21, and the third element S3 as the core of the short circuit detector 4 is an element that monitors the current flowing through the second connection line 22. The second element S2 is connected to the branch wire 23 that is connected in parallel with the pair of first connection lines 21, as with the first element S1. The third element S3 is connected to the second connection line 22. The third element S3 which is a mechanical relay having Form A contacts (make contacts) has a coil connected in series with the second connection line 22 and contacts connected in series between the terminals of the fourth terminal pair 14. Without taking the behavior of the second element S2 (described later) into consideration, the short circuit signal is in the ON state when the contacts of the third element S3 are closed, and in the OFF state when the contacts of the third element S3 are open.

When the thermosensitive wire 3 is short-circuited, the pair of conductive wires 1 constituting the thermosensitive wire 3 are electrically connected at the short circuit location, so that current does not flow through the conductive wires 1 on the side (i.e. the thermosensitive wire second end 3b side) farther from the second power source 10 than the short circuit location and the second connection line 22 electrically connecting the pair of conductive wires 1 on the thermosensitive wire second end 3b side. Consequently, current does not flow through the coil of the third element S3, as a result of which the contacts are open and the short circuit signal is in the OFF state. Here, given that current does not flow through the second connection line 22 also in the case where the thermosensitive wire 3 is disconnected, it is not preferable to switch the short circuit signal ON and OFF only by the third element S3. The second element S2 is provided at the first connection line 21 (the branch wire 23 in this example) in order to output the short circuit signal in a state in which a short circuit and a disconnection are distinguishable from each other.

In this embodiment, the second element S2 is a mechanical relay having Form B contacts (break contacts). The second element S2 is an element whose contacts are open in the case where current flows through the coil and are closed in the case where current does not flow through the coil. The coil of the second element S2 is connected in series with the branch wire 23, and the contacts of the second element S2 are connected in series between the terminals of the fourth terminal pair 14. As mentioned above, the contacts of the third element S3 are also connected in series between the terminals of the fourth terminal pair 14. That is, the two routes, i.e. the route via the contacts of the second element S2 and the route via the contacts of the third element S3, are formed in parallel between the two terminals of the fourth terminal pair 14. In the case where at least one of the two routes forms a closed circuit, the short circuit signal is in the ON state. In the case where neither of the two routes forms a closed circuit, the short circuit signal is in the OFF state. Thus, the second element S2 and the third element S3 are wired-OR connected to the fourth terminal pair 14.

When the thermosensitive wire 3 is short-circuited, current flows on the side closer to the second power source 10 than the short circuit location. In detail, current flows through the first connection lines 21 and the branch wire 23 connected in parallel with the first connection lines 21. Therefore, when a short circuit occurs, the contacts of the second element S2, which are Form B contacts, are open. When the contacts of the third element S3 are open, the two routes connecting the terminals of the fourth terminal pair 14 are both open, so the short circuit signal is in the OFF state. When the thermosensitive wire 3 is disconnected, on the other hand, current does not flow through the first connection lines 21 and the branch wire 23, as mentioned above. Accordingly, the contacts of the second element S2, which are Form B contacts, are closed. Here, since current does not flow through the second connection line 22, the contacts of the third element S3 are open. However, the ON state of the short circuit signal can be maintained because the fourth terminal pair 14 is connected via the contacts of the third element S3. Thus, the short circuit signal is output in a state in which a short circuit and a disconnection are distinguishable from each other, enabling the controller 7 to distinguish between a short circuit and a disconnection.

The fourth element S4 as the core of the power source abnormality detector 6 is an element that monitors the current flowing through the power source monitoring line 24 connecting the positive terminal P and the negative terminal N of the second power source 10. The power source monitoring line 24 is connected to the second power source 10 in parallel with the thermosensitive wire 3 on the thermosensitive control board 30. The power source monitoring line 24 is thus a line through which current flows if a voltage is output from the second power source 10 regardless of the state (short circuit or disconnection) of the thermosensitive wire 3. In this embodiment, the fourth element S4 is a mechanical relay having Form A contacts (make contacts). The coil of the fourth element S4 is connected in series with the power source monitoring line 24, and the contacts of the fourth element S4 are connected in series between the terminals of the sixth terminal pair 16. The power source abnormality signal is in the ON state when the contacts of the fourth element S4 are closed, and in the OFF state when the contacts of the fourth element S4 are open.

In the case where the voltage output from the second power source 10 is more than the criterion voltage, current sufficient to close the contacts flows through the power source monitoring line 24. In the case where the voltage output from the second power source 10 is less than or equal to the criterion voltage, current sufficient to close the contacts does not flow through the power source monitoring line 24, and the contacts are open. That is, when the voltage output from the second power source 10 is less than or equal to the criterion voltage, the contacts of the fourth element S4 are open and the power source abnormality signal is in the OFF state.

Table 1 below shows the open/closed state (OFF: open, ON: closed) of the contacts of each of the first element S1, the second element S2, the third element S3, the fourth element S4, and the fifth element S5 and the state of each of the short circuit signal (SHORT), the disconnection signal (OPEN), and the power source abnormality signal (READY) in the case where the thermosensitive wire 3 is the normal condition, in the case where the thermosensitive wire 3 is short-circuited, in the case where the thermosensitive wire 3 is disconnected, and in the case where the second power source 10 is the abnormal condition (i.e. the output voltage is less than or equal to the criterion voltage).

TABLE 1

|       | Normal | Short circuit | Disconnection | Power source abnormality |
|-------|--------|---------------|---------------|--------------------------|
| S1    | ON     | ON            | OFF           | OFF                      |
| S2    | OFF    | OFF           | ON            | ON                       |
| S3    | ON     | OFF           | OFF           | OFF                      |
| S4    | ON     | ON            | ON            | OFF                      |
| S5    | ON     | ON            | OFF           | OFF                      |
| SHORT | ON     | OFF           | ON            | ON                       |
| OPEN  | ON     | ON            | OFF           | OFF                      |
| READY | ON     | ON            | ON            | OFF                      |

As shown in Table 1, in the case where the pair of conductive wires 1 are short-circuited, only the short circuit signal is in the OFF state. Hence, the controller 7 can determine that the pair of conductive wires 1 are short-circuited as clearly distinguished from the case where at least one of the pair of conductive wires 1 is disconnected and the case where the second power source 10 is the abnormal condition, and perform abnormality control (short circuit abnormality control) according to the abnormality. In the case where at least one of the pair of conductive wires 1 is disconnected, only the disconnection signal is in the OFF state. Hence, the controller 7 can determine that at least one of the pair of conductive wires 1 is disconnected as clearly distinguished from the case where the pair of conductive wires 1 are short-circuited and the case where the second power source 10 is the abnormal condition, and perform abnormality control (disconnection abnormality control) according to the abnormality. In the case where the second power source 10 is the abnormal condition, the power source abnormality signal and the disconnection signal are in the OFF state. In this case, it is at least clear that the pair of conductive wires 1 are not short-circuited. Moreover, only the disconnection signal is in the OFF state if at least one of the pair of conductive wires 1 is disconnected. Hence, the controller 7 can determine that the second power source 10 is the abnormal condition as clearly distinguished from the case where the pair of conductive wires 1 are short-circuited and the case where at least one of the pair of conductive wires 1 is disconnected, and perform abnormality control (power source abnormality control) according to the abnormality.

FIG. 4 is a circuit block diagram illustrating a second example (second power supply system 100B) of the power supply system 100. The same elements as in the first power supply system 100A are given the same reference signs, and their description is omitted as appropriate. The differences of the second power supply system 100B from the first power supply system 100A will be mainly described below.

The second power supply system 100B differs from the first power supply system 100A described above with reference to FIG. 3 in that the second power supply system 100B does not include the sixth terminal pair 16 while the first power supply system 100A includes the sixth terminal pair 16. Therefore, while the first power supply system 100A is configured to output three abnormality signals, i.e. the short circuit signal, the disconnection signal, and the power source abnormality signal, the second power supply system 100B is not configured to output the power source abnormality signal (READY) to the controller 7. The second power supply system 100B includes the fourth element S4, and generates a signal corresponding to the power source abnormality signal. The second power supply system 100B is configured so that the short circuit signal (SHORT) will be in the OFF state in the case where the condition for causing the power source abnormality signal to be in the OFF state is met.

Table 2 below shows the open/closed state (OFF: open, ON: closed) of the contacts of each of the first element S1, the second element S2, the third element S3, the fourth element S4, and the fifth element S5 and the state of each of the short circuit signal (SHORT) and the disconnection signal (OPEN) in the case where the thermosensitive wire 3 is the normal condition, in the case where the thermosensitive wire 3 is short-circuited, in the case where the thermosensitive wire 3 is disconnected, and in the case where the second power source 10 is the abnormal condition (i.e. the output voltage is less than or equal to the criterion voltage) in the second power supply system 100B.

TABLE 2

|       | Normal | Short circuit | Disconnection | Power source abnormality |
|-------|--------|---------------|---------------|--------------------------|
| S1    | ON     | ON            | OFF           | OFF                      |
| S2    | OFF    | OFF           | ON            | ON                       |
| S3    | ON     | OFF           | OFF           | OFF                      |
| S4    | ON     | ON            | ON            | OFF                      |
| S5    | ON     | ON            | OFF           | OFF                      |
| SHORT | ON     | OFF           | ON            | OFF                      |
| OPEN  | ON     | ON            | OFF           | OFF                      |

As mentioned above, in the case where the short circuit detector 4 detects that the pair of conductive wires 1 are short-circuited, as the abnormality control (short circuit abnormality control), the controller 7 immediately stops the power supply to the power supply wire 8 from the first power source 80, outputs power supply abnormality information indicating the abnormality of the power supply wire 8 by the user interface 9, and suspends the power supply to the power supply wire 8 until the user interface 9 receives input indicating verification that the power supply wire 8 is the normal condition. In the case where the power source abnormality detector 6 detects that the voltage of the second power source 10 is less than or equal to the criterion voltage, the controller 7 immediately stops the power supply to the power supply wire 8 from the first power source 80, outputs second power source abnormality information indicating the abnormality of the second power source 10 by the user interface 9, and suspends the power supply to the power supply wire 8 until the user interface 9 receives input indicating verification that the second power source 10 is the normal condition.

Thus, the abnormality control performed in the case where the thermosensitive wire 3 is short-circuited and the abnormality control performed in the case where the second power source 10 is the abnormal condition is different in whether the abnormality information output from the user interface 9 is "power supply abnormality information" or "second power source abnormality information", and whether the condition for ending the suspension of the power supply to the power supply wire 8 is "checking that the power supply wire 8 is the normal condition" or "checking that the second power source 10 is the normal condition". Meanwhile, the two abnormality controls are common in that the power supply to the power supply wire 8 from the first power source 80 is stopped. The abnormality information output from the user interface 9 can be regarded as "power supply abnormality information" in a broad sense because it represents the state in which power cannot be supplied to the power supply wire 8. Moreover, checking that the power supply wire 8 is the normal condition and checking that the second power source 10 is the normal condition can be, for example, regarded as "checking that power supply can be performed normally". Hence, even when the short circuit signal and the power source abnormality signal are integrated in the second power supply system 100B, the same abnormality control as in the first power supply system 100A can be performed.

For example, in the case where the controller 7 is configured to receive only the short circuit signal and the disconnection signal (e.g. in the case where the number of ports that can be used in the processor, the connectors of the controller 7, etc. are limited) in the existing power supply system 100, by using the second power supply system 100B, the existing thermosensitive control board 30 can be replaced with the thermosensitive control board 30 in the second power supply system 100B. In other words, the power supply system 100 can be configured to detect the abnormality in the second power source 10 without significantly changing the power supply system 100.

FIG. 5 is a circuit block diagram illustrating a third example (third power supply system 100C) of the power supply system 100. The same elements as in the first power supply system 100A are given the same reference signs, and their description is omitted as appropriate. The differences of the third power supply system 100C from the first power supply system 100A will be mainly described below.

As described above with reference to FIG. 3, the first power supply system 100A includes the branch wire 23 connected in parallel with the pair of first connection lines 21, and the first element S1 and the second element S2 are connected in series with the branch wire 23. Moreover, in the first power supply system 100A, the coil of the fifth element S5 whose contacts are connected in series with the branch wire 23 is connected in series with one of the pair of first connection lines 21 (the positive-side first connection line 21a in this embodiment). The third power supply system 100C, on the other hand, does not include the branch wire 23, and the first element S1 and the second element S2 are provided at one of the pair of first connection lines 21 (the positive-side first connection line 21a in this example). Since the third power supply system 100C does not include the branch wire 23, the third power supply system 100C does not include the fifth element S5.

The branch wire 23 in the first power supply system 100A (and the second power supply system 100B) is provided in order to suppress an increase in load (i.e. an increase in impedance) caused by connecting many elements (mechanical relays in this example) in series with the closed circuit formed by the second power source 10 and the thermosensitive wire 3. The increase in load involves a voltage drop in the thermosensitive wire 3, which may lead to an error in disconnection detection and the like. However, for example in the case where the extension distance of the power supply wire 8 is relatively short and the extension distance of the thermosensitive wire 3 located along the power supply wire 8 is relatively short, the impedance of the thermosensitive wire 3 is low, so that an increase in impedance may be tolerable even when a plurality of mechanical relays are connected in series with the thermosensitive wire 3. The third power supply system 100C is suitable in such a case.

Table 3 below shows the open/closed state (OFF: open, ON: closed) of the contacts of each of the first element S1, the second element S2, the third element S3, and the fourth element S4 and the state of each of the short circuit signal (SHORT), the disconnection signal (OPEN), and the power source abnormality signal (READY) in the case where the thermosensitive wire 3 is the normal condition, in the case where the thermosensitive wire 3 is short-circuited, in the case where the thermosensitive wire 3 is disconnected, and in the case where the second power source 10 is the abnormal condition (i.e. the output voltage is less than or equal to the criterion voltage) in the third power supply system 100C.

TABLE 3

|  | Normal | Short circuit | Disconnection | Power source abnormality |
|---|---|---|---|---|
| S1 | ON | ON | OFF | OFF |
| S2 | OFF | OFF | ON | ON |
| S3 | ON | OFF | OFF | OFF |
| S4 | ON | ON | ON | OFF |
| SHORT | ON | OFF | ON | ON |
| OPEN | ON | ON | OFF | OFF |
| READY | ON | ON | ON | OFF |

As is clear from the comparison between Tables 1 and 3, even in the case where the fifth element S5 is not provided, the controller 7 can clearly distinguish among the short circuit signal, the disconnection signal, and the power source abnormality signal and perform abnormality control according to each of the abnormalities of a short circuit, a disconnection, and a power source abnormality, as in the first power supply system 100A. The branch wire 23 and the fifth element S5 may be omitted in the second power supply system 100B as well, although not illustrated.

Figure 6:
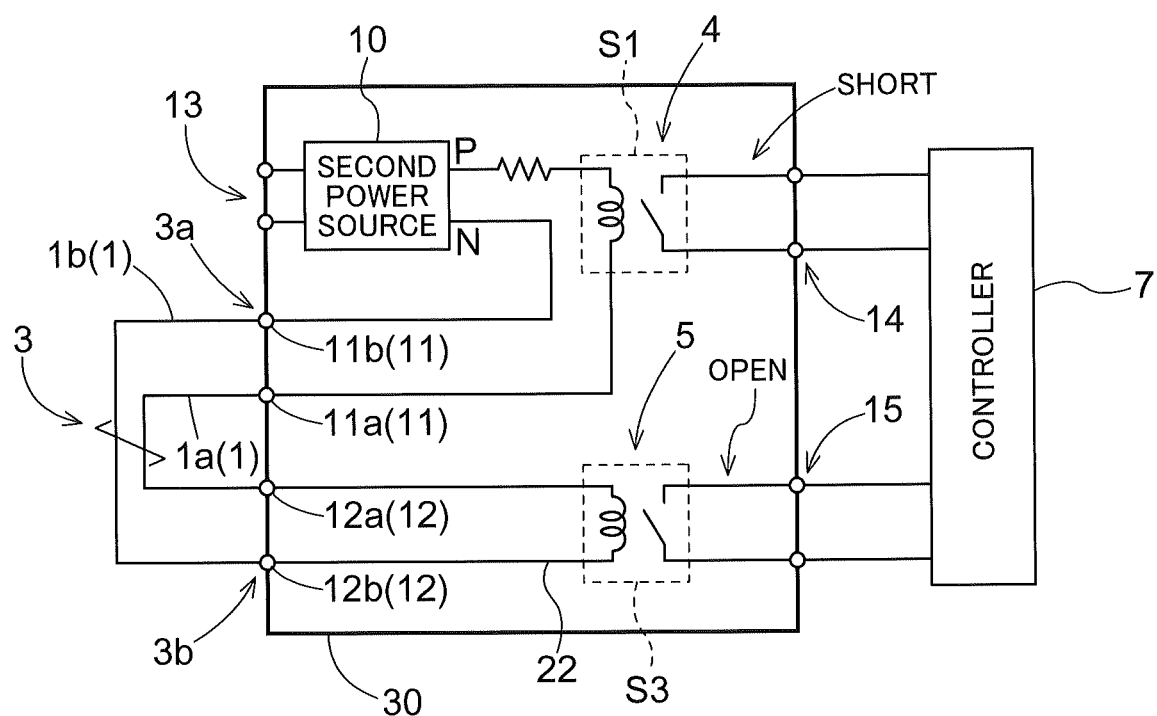
FIG. 6 is a schematic circuit block diagram illustrating a fourth example of the power supply system.

While the first power supply system 100A, the second power supply system 100B, and the third power supply system 100C have been described above, the power supply system 100 may include a simplified thermosensitive control board 30 that does not perform detection on the second power source 10 by the power source abnormality signal (READY). FIG. 6 illustrates a fourth power supply system 100D including such a simplified thermosensitive control board 30. The same elements as in the first power supply system 100A, the second power supply system 100B, and the third power supply system 100C are given the same reference signs, and their description is omitted as appropriate.

The fourth power supply system 100D includes the first element S1 included in the short circuit detector 4 and serving as the core of the short circuit detector 4, and the third element S3 included in the disconnection detector 5 and serving as the core of the disconnection detector 5. The first element S1 and the third element S3 are each a mechanical relay having Form A contacts (make contacts) as above. In the first power supply system 100A, the second power supply system 100B, and the third power supply system 100C, the first element S1 is included in the disconnection detector 5 and the third element S3 is included in the short circuit detector 4. In the fourth power supply system 100D, the first element S1 is included in the short circuit detector 4 and the third element S3 is included in the disconnection detector 5.

Table 4 below shows the open/closed state (OFF: open, ON: closed) of the contacts of each of the first element S1 and the third element S3 and the state of each of the short circuit signal (SHORT) and the disconnection signal (OPEN) in the case where the thermosensitive wire 3 is the normal condition, in the case where the thermosensitive wire 3 is short-circuited, and in the case where the thermosensitive wire 3 is disconnected in the fourth power supply system 100D.

TABLE 4

|  | Normal | Short circuit | Disconnection |
| --- | --- | --- | --- |
| S1 | ON | ON | OFF |
| S3 | ON | OFF | OFF |
| SHORT | ON | ON | OFF |
| OPEN | ON | OFF | OFF |

As shown in Table 4, in the case where the pair of conductive wires 1 are short-circuited, only the disconnection signal is in the OFF state. Hence, the controller 7 can determine that the pair of conductive wires 1 are short-circuited as clearly distinguished from the case where at least one of the pair of conductive wires 1 is disconnected, and perform abnormality control (short circuit abnormality control) according to the abnormality. In the case where at least one of the pair of conductive wires 1 is disconnected, the disconnection signal and the short circuit signal are in the OFF state. Hence, the controller 7 can determine that at least one of the pair of conductive wires 1 is disconnected as clearly distinguished from the case where the pair of conductive wires 1 are short-circuited, and perform abnormality control (disconnection abnormality control) according to the abnormality.

An overview of each embodiment of the power supply system described above will be briefly given below.

According to one preferred aspect, a power supply system includes: a power supply wire located along a route of a mobile object and configured to supply power to the mobile object; a first power source configured to supply power to the power supply wire; a thermosensitive wire located along the power supply wire and including a pair of conductive wires each covered with an insulator that softens at a preset temperature, the pair of conductive wires being configured to come into contact with each other to be short-circuited in response to the insulator softening; a second power source configured to supply power to the pair of conductive wires; a short circuit detector configured to detect that the pair of conductive wires are short-circuited; a disconnection detector configured to detect that the pair of conductive wires are disconnected; and a controller configured to perform, for power supply to the power supply wire, abnormality control that differs between in the case where the short circuit detector detects that the pair of conductive wires are short-circuited and in the case where the disconnection detector detects that the pair of conductive wires are disconnected.

With this structure, a short circuit of the pair of conductive wires caused by abnormal heat generation of the power supply wire and a disconnection of the pair of conductive wires can be detected distinguishably from each other and, based on the detection result, abnormality control that differs depending on whether the abnormality is a short circuit or a disconnection can be performed. It is thus possible to detect a short circuit and a disconnection of the thermosensitive wire located along the power supply wire distinguishably from each other and perform fail-safe control according to the detection result.

Preferably, the power supply system further includes a user interface configured to receive input of information from a user and output information for the user, and the controller is configured to: in the case where the short circuit detector detects that the pair of conductive wires are short-circuited, (i) immediately stop the power supply to the power supply wire from the first power source, (ii) output, by the user interface, power supply abnormality information indicating an abnormality of the power supply wire, and (iii) suspend the power supply to the power supply wire until the user interface receives input indicating verification that the power supply wire is the normal condition, as the abnormality control; and in the case where the disconnection detector detects that the pair of conductive wires are disconnected, (i) continue the power supply to the power supply wire from the first power source and (ii) output, by the user interface, check request information requesting to check a state of the thermosensitive wire, as the abnormality control.

With this structure, in the case where abnormal heat generation of the power supply wire is detected from a short circuit of the pair of conductive wires, the power supply to the power supply wire is immediately stopped and is not resumed until the power supply wire is checked to be the normal condition. Thus, the power supply wire is prevented from keeping generating heat, with it being possible to ensure safety. In the case where a disconnection of the pair of conductive wires is detected, there is often no abnormality in the power supply wire. Accordingly, the power supply to the power supply wire is continued to continue the operation of the mobile object. In addition, the check request information requesting to check the state of the thermosensitive wire is output to cause the user to check the state of the thermosensitive wire and replace the thermosensitive wire, as a result of which the thermosensitive wire can be restored to the normal state. This prevents the situation in which the temperature of the power supply wire cannot be monitored from continuing for a long period of time.

Preferably, to continue the power supply to the power supply wire from the first power source includes to temporarily stop the power supply to the power supply wire from the first power source and thereafter resume the power supply to the power supply wire from the first power source in response to the user interface receiving input indicating permission to continue the power supply to the power supply wire.

With this structure, after the power supply to the power supply wire is temporarily stopped, the power supply to the power supply wire is resumed on condition that the user confirms it, so that safety can be further enhanced. After the power supply to the power supply wire is resumed, the movement of the moving object can be continued, and the user can check the state of the pair of conductive wires and replace them, thereby quickly restoring the thermosensitive wire to the normal state.

Preferably, the power supply system further includes a power source abnormality detector configured to detect that a voltage of the second power source is less than or equal to a preset criterion voltage, and the controller is configured to, in the case where the power source abnormality detector detects that the voltage of the second power source is less than or equal to the criterion voltage, perform, for the power supply to the power supply wire, abnormality control that differs from in the case where the short circuit detector detects that the pair of conductive wires are short-circuited and in the case where the disconnection detector detects that the pair of conductive wires are disconnected.

With this structure, a decrease in the voltage of the second power source can be detected as distinguished from a short circuit of the pair of conductive wires and a disconnection of the pair of conductive wires. Abnormality control depending on whether the voltage of the second power source decreases, the pair of conductive wires are short-circuited, or the pair of conductive wires are disconnected can thus be performed.

Preferably, the power supply system further includes a user interface configured to receive input of information from a user and output information for the user, and the controller is configured to, in the case where the power source abnormality detector detects that the voltage of the second power source is less than or equal to the criterion voltage, (i) immediately stop the power supply to the power supply wire from the first power source, (ii) output, by the user interface, second power source abnormality information indicating an abnormality of the second power source, and (iii) suspend the power supply to the power supply wire until the user interface receives input indicating verification that the second power source is the normal condition.

In the case where the voltage of the second power source decreases, abnormal heat generation of the power supply wire cannot be detected by the pair of conductive wires. With this structure, in the case where a decrease in the voltage of the second power source is detected, the power supply to the power supply wire is immediately stopped and is not resumed until the second power source is checked to be the normal condition, with it being possible to ensure safety.

Preferably, the power supply system further includes: a first terminal pair to which respective first ends of the pair of conductive wires are connected; and a pair of first connection lines connecting the first terminal pair and the second power source, the disconnection detector includes a first element configured to monitor a current flowing through the pair of first connection lines, and the first element is connected to a branch wire connected in parallel with the pair of first connection lines.

With this structure, by monitoring the current supplied from the second power source to the pair of conductive wires through the pair of first connection lines, it is possible to appropriately detect that the pair of conductive wires are disconnected and current does not flow through the pair of conductive wires. Since the first element is connected to the branch wire connected in parallel with the first connection lines, the first element can be kept from affecting the output impedance for the pair of conductive wires as seen from the second power source.

Preferably, the power supply system further includes: a first terminal pair to which respective first ends of the pair of conductive wires are connected; a second terminal pair to which respective second ends of the pair of conductive wires are connected; a pair of first connection lines connecting the first terminal pair and the second power source; and a second connection line connecting terminals of the second terminal pair to each other, the short circuit detector includes a second element configured to monitor a current flowing through the pair of first connection lines, and a third element configured to monitor a current flowing through the second connection line, and the second element is connected to a branch wire connected in parallel with the pair of first connection lines.

With this structure, the second element monitors the current supplied from the second power source to the pair of conductive wires, and the third element monitors the current at the end of the pair of conductive wires opposite to the side on which the second power source is connected. In this way, it is possible to appropriately detect that the pair of conductive wires are short-circuited and not disconnected. Since the second element is connected to the branch wire connected in parallel with the first connection lines, the second element can be kept from affecting the output impedance for the pair of conductive wires as seen from the second power source.

What is claimed is:

1. A power supply system, comprising:
   a power supply wire located along a route of a mobile object and configured to supply power to the mobile object;
   a first power source configured to supply power to the power supply wire;
   a thermosensitive wire located along the power supply wire and comprising a pair of conductive wires each covered with an insulator that softens at a preset temperature, the pair of conductive wires configured to come into contact with each other to be short-circuited in response to the insulator softening;
   a second power source configured to supply power to the pair of conductive wires;
   a short circuit detector configured to detect that the pair of conductive wires are short-circuited in a state in which the second power source is energizing the thermosensitive wire;
   a disconnection detector configured to detect that the pair of conductive wires are disconnected, a disconnection of the pair of conductive wires being different than a short circuit of the conductive wires in a state in which the second power source is energizing the thermosensitive wire; and
   a controller configured to perform, for power supply to the power supply wire, a first abnormality control when the short circuit detector detects that the pair of conductive wires are short-circuited and a second abnormality control when the disconnection detector detects that the pair of conductive wires are disconnected,
   wherein the first abnormality control is different from the second abnormality control,
   wherein the disconnection detector comprises a first element having make contacts,
   wherein the short circuit detector comprises a second element comprising break contacts and a third element comprising make contacts,
   wherein the first element is configured to be in an ON state when the pair of conductive wires are in a normal condition or in a short-circuited condition, and to be in an OFF state when the pair of conductive wires are in a disconnected condition,
   wherein the second element is configured to be in an OFF state when the pair of conductive wires are in a normal condition or in a short-circuited condition, and to be in an ON state when the pair of conductive wires are in a disconnected condition, and wherein the third element is configured to be in an ON state when the pair of conductive wires are in a normal condition, and to be in an OFF state when the pair of conductive wires are in a short-circuited condition or in a disconnected condition.

2. The power supply system according to claim 1, further comprising:

a user interface configured to receive input of information from a user and output information for the user, and wherein the controller is configured to:

in the case where the short circuit detector detects that the pair of conductive wires are short-circuited, (i) immediately stop the power supply to the power supply wire from the first power source, (ii) output, by the user interface power supply abnormality information indicating an abnormality of the power supply wire, and (iii) suspend the power supply to the power supply wire until the user interface receives input indicating verification that the power supply wire is a normal condition, as the abnormality control; and in the case where the disconnection detector detects that the pair of conductive wires are disconnected, (i) continue the power supply to the power supply wire from the first power source and (ii) output, by the user interface check request information requesting to check a state of the thermosensitive wire, as the abnormality control.

3. The power supply system according to claim 2, wherein to continue the power supply to the power supply wire from the first power source includes:

to temporarily stop the power supply to the power supply wire from the first power source and thereafter resume the power supply to the power supply wire from the first power source in response to the user interface receiving input indicating permission to continue the power supply to the power supply wire.

4. The power supply system according to claim 1, further comprising:

a power source abnormality detector configured to detect that a voltage of the second power source is less than or equal to a preset criterion voltage, and wherein the controller is configured to, in the case where the power source abnormality detector detects that the voltage of the second power source is less than or equal to the criterion voltage, perform, for the power supply to the power supply wire, abnormality control that differs from in the case where the short circuit detector detects that the pair of conductive wires are short-circuited and in the case where the disconnection detector detects that the pair of conductive wires are disconnected.

5. The power supply system according to claim 4, further comprising:

a user interface configured to receive input of information from a user and output information for the user, and wherein the controller is configured to, in the case where the power source abnormality detector detects that the voltage of the second power source is less than or equal to the criterion voltage, (i) immediately stop the power supply to the power supply wire from the first power source, (ii) output, by the user interface second power source abnormality information indicating an abnormality of the second power source, and (iii) suspend the power supply to the power supply wire until the user interface receives input indicating verification that the second power source is a normal condition.

6. The power supply system according to claim 1, further comprising:

a first terminal pair to which respective first ends of the pair of conductive wires are connected; and a pair of first connection lines connecting the first terminal pair and the second power source, wherein the disconnection detector includes a first element configured to monitor a current flowing through the pair of first connection lines, and wherein the first element is connected to a branch wire connected in parallel to the pair of first connection lines.

7. The power supply system according to claim 1, further comprising:

a first terminal pair to which respective first ends of the pair of conductive wires are connected;

a second terminal pair to which respective second ends of the pair of conductive wires are connected;

a pair of first connection lines connecting the first terminal pair and the second power source; and a second connection line connecting terminals of the second terminal pair to each other, wherein the short circuit detector comprises:

a second element configured to monitor a current flowing through the pair of first connection lines; and a third element configured to monitor a current flowing through the second connection line, and wherein the second element is connected to a branch wire connected in parallel with the pair of first connection lines.

8. A power supply system, comprising:

a power supply wire located along a route of a mobile object and configured to supply power to the mobile object;

a first power source configured to supply power to the power supply wire;

a thermosensitive wire located along the power supply wire and comprising a pair of conductive wires each covered with an insulator that softens at a preset temperature, the pair of conductive wires configured to come into contact with each other to be short-circuited in response to the insulator softening;

a second power source configured to supply power to the pair of conductive wires;

a short circuit detector configured to detect that the pair of conductive wires are short-circuited in a state in which the second power source is energizing the thermosensitive wire;

a disconnection detector configured to detect that the pair of conductive wires are disconnected, a disconnection of the pair of conductive wires being different than a short circuit of the conductive wires in a state in which the second power source is energizing the thermosensitive wire; and a controller configured to perform, for power supply to the power supply wire, a first abnormality control when the short circuit detector detects that the pair of conductive wires are short-circuited and a second abnormality control when a disconnection detector detects that the pair of conductive wires are disconnected, wherein the first abnormality control is different from the second abnormality control, wherein the short circuit detector comprises a first element having make contacts, wherein the disconnection detector comprises a second element having make contacts, wherein the first element is configured to be in an ON state when the pair of conductive wires are in a normal condition or in a short-circuited condition, and to be in an OFF state when the pair of conductive wires are in a disconnected condition, and wherein the second element is configured to be in an ON state when the pair of conductive wires are in a normal condition, and to be in an OFF state when the pair of conductive wires are in a short-circuited condition or a disconnected condition.

\* \* \* \* \*